UNITED STATES PATENT OFFICE.

HUGH KERR, OF NEW YORK, N. Y.

PROCESS OF ANNEALING WIRE.

SPECIFICATION forming part of Letters Patent No. 291,358, dated January 1, 1884.

Application filed October 8, 1883. (No specimens.)

*To all whom it may concern:*

Be it known that I, HUGH KERR, a citizen of the United States, residing at New York city, in the county and State of New York, have invented a new and useful Process of Annealing Wire; and I do hereby declare that the following is a full, clear, and exact description of the invention, which will enable others skilled in the art to which it appertains to make and use the same.

The object of my invention is to produce a soft, pliable, durable, and tough piece of wire which will withstand long and continued wear without becoming hard or brittle, the wire produced by my improved process being especially adapted for use in forming joints for belting, for which I have made separate application for Letters Patent.

In carrying out my invention I place a suitable quantity of wire in a bundle of wet hay or straw, in which it is allowed to remain for twenty-four hours or more. The wire is then taken out and passed over a bass-wood fire, made for the purpose, until the wire attains a heat equal to 550° Fahrenheit, when it is removed and allowed to cool quickly, care being taken that it does not get wet after being removed from the fire, the entire process being conducted in a dark room.

The wire produced by my above-described process is of a soft, pliable, and tough nature, and retains those properties after long and continuous use, the same being adapted for any purpose where elasticity, pliability, and toughness of the wire are desirable.

Having thus described my invention, what I claim as new and useful, and desire to secure by Letters Patent, is—

The herein-described process of annealing wire, consisting in first placing the wire in a bundle of wet hay or straw and leaving it therein for twenty-four hours or more, then removing the wire and passing it over a bass-wood fire until it attains a heat equal to 550° Fahrenheit, then in allowing it to cool quickly, the whole process being conducted in a dark room, all substantially as specified.

HUGH KERR.

Witnesses:
ISABELLA KERR,
ELIZABETH KERR.